United States Patent Office 3,230,210
Patented Jan. 18, 1966

3,230,210
PROCESS FOR PREPARING AMINO ACID SUB-
STITUTED AMIDES FROM PROTEINACEOUS
MATERIALS
Harland H. Young, Western Springs, and Kurt H. Spitz-
mueller, Clarendon Hills, Ill., assignors to Swift &
Company, Chicago, Ill., a corporation of Illinois
No Drawing. Filed June 17, 1959, Ser. No. 820,848
9 Claims. (Cl. 260—112)

This invention relates to a method for treating proteins to provide valuable new protein derivatives and, more particularly, to the amidation of proteinaceous materials and the products thereby obtained.

The treatment of amino acids which are the building blocks of protein molecules to convert the amino acids or the proteins into useful industrial chemical compounds has long been a subject of substantial interest because of the large supply and availability of protein material of industrial or nonedible grade. Nevertheless no significant commercially practicable method has been developed which will provide for the utilization of proteins in the production of useful industrial chemicals.

It is therefore an object of this invention to provide a method for treating proteinaceous materials to upgrade the value of the proteinaceous materials and produce useful industrial chemical products.

A further object of the invention is the provision of protein derivatives from which surface-active and detergent products can be prepared.

Additional objects, if not specifically set forth herein, will be readily apparent to those skilled in the art from the detailed description of the invention which follows.

Broadly it is within the contemplation of the present invention to produce valuable new industrial chemical products by reacting proteinaceous materials with aliphatic amines under essentially anhydrous conditions. When the proteinaceous materials are reacted with aliphatic polyamines having at least one replaceable amino hydrogen or alkylolamines having at least one replaceable amino hydrogen under essentially anhydrous conditions, amides of amino acids and polypeptides having desirable properties are thereby produced. The replaceable amino hydrogen of the alkylolamine or polyamine is necessary since the reaction involves a condensation as distinguished from hydrolysis to produce amidated amino acids and amidated polyeptides.

More particularly, the substituted amino acid amides are prepared by reacting the polyamine or alklolamine with a proteinaceous material by heating the amine-supplying composition with the protein or protein hydrolysis product under essentially anhydrous conditions, until a clear viscous reaction product is formed. Usually about equal weights of the amine-supplying composition and the protein will be reacted, but larger amounts of the amine can be employed to increase the fluidity of the mixture where efficient agitation is not readily obtainable because of the body of the mixture. Efficient agitation is important in the process, and therefore there must be considerable shearing force effected by the stirrer in order to accelerate reaction within the viscous mass. An excess of free amine tends to reduce the viscosity of this mass.

The amine reactant may be selected from any of the water-soluble aliphatic amines having at least one replaceable amino hydrogen and two or more amino groups. Primary and secondary aliphatic diamines, triamines, tetramines, pentamines, and hexamines are suitable as the amine reactant. Typical nonhydroxylated aliphtic polymines include ethylene diamine, propylene diamine, butylene diamine, diethylene triamine, dipropylene triamine, pentamethylene diamine, triethylene tetramine, tetraethylene pentamine, and other straight-chain aliphatic polyamines having more than one amino nitrogen and having from two to ten carbon atoms. The water-soluble dialkylamino alkylamines, such as diethyl amino propylamine, are also suitable. It should be noted, however, that while ethylene diamine is reactive and can be employed in the process, other polyamines are preferable as the amine-supplying element. Because of the relatively high volatility of ethylene diamine, the less volatile polyamines, i.e., those boiling above about 120° C. at atmospheric pressure, are preferred. If it is desirable to prepare the amide from more volatile polyamines, for example, ethylene diamine, the reaction can be run under a positive pressure in the absence of moisture.

Water-soluble alkylolamines which can be employed in preparing the products of the invention include ethanolamine, diethanolamine, isopropanolamine, glycerolamine, and other water-soluble primary and secondary alkylolamines. Substituted alkylolamines, such as N-amino ethyl ethanolamine, N-alkyl alkylolamines, and polyglycolamines containing at least one primary or secondary amino nitrogen, can also be employed. Generally, alkylolamines having 2-10 carbons either unsubstituted or having noninterfering substituents are desirable amine-supplying reactants.

Naturally-occurring animal and vegetable proteins may be employed as the protein reactant in the process. Animal glue, casein, gelatin, blood, feathers, hair, hide trimmings, offal, soya protein, cottonseed protein, peanut protein, etc., may be utilized as the protein component in the reaction to provide a wide diversity of products. It has been discovered that the protein or protein hydrolysis product must contain more than one peptide group —CO.NH— in order to insure that the reaction proceed since simple amino acids having the general structure

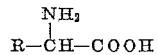

where R is an aliphatic or substituted aliphatic radical, do not undergo a smooth reaction with the amine reactant. Rather, the reaction between the amino acid and alkylolamine or polyamine involves decomposition with evolution of gas.

The condensation reaction is carried out by heating and agitating approximately equimolar amounts of the reactants after removing water from the reaction mixture, until the protein is completely dissolved in the amine as evidenced by a clear viscous reaction mixture. Hydrolysis is avoided by maintaining the reaction conditions such that there is present during the reaction less than 20% water based on the weight of the protein raw material. The maintenance of this level or less water is deemed to satisfy the requirement with respect to essentially anhydrous conditions. In those cases where the protein possesses larger amounts of water, removal of the water by heating the reactants under vacuum prior to the reaction is advisable. Although the presence of water results in the production of small amounts of hydrolysis products, the majority of the peptide linkages undergo the desired amidation reaction.

The general description of the process involved treatment of wet and dry proteinaceous materials follows. Dry materials may contain from about 5–15% moisture as is typical of commercial glue, casein, or hoof meal, Wet material, often described as green stock as in the case of raw offal or hide trimmings, contains up to 60–80% moisture.

DRY PROCESS

Air dried ground proteinaceous material is mixed with approximately equal weights of the amine-supplying element. If desired, a larger amount of the amine may be employed to produce a stirrable mix. An inert atmosphere is provided either by way of a vacuum or blanketing the reaction mixture with an inert gas such as nitrogen. The reaction vessel is fitted with a fractionating condenser which will permit moisture to leave the reaction vessel but which will return the condensed amine to the reaction. Heat is applied and the mixture is agitated vigorously while the temperature is raised to just below the boiling point of the reacting amine. The reaction of all of the protein will be evidenced by a clear viscous reaction product. The time of heating varies inversely with the temperature, and the temperature is governed by the pressure in the reaction vessel and the boiling point of the reacting amine.

WET PROCESS

The wet process is similar to the dry process with the exception that the green stock containing from 60 to 80% moisture is usually comminuted to a fine pasty consistency before charging to the reaction vessel. Also the use of vacuum is much more important in the wet process because of the need for removing moisture prior to heating to the amidating temperature. It is possible to fractionally distill the moisture out of the vessel without excessive loss of the amine reactant when the amine reactant is of relatively high boiling point.

While completion of the reaction is more easily determined with those proteins which are difficultly soluble in dilute alkali, it is preferable in all cases to measure completion of the reaction by treating a cold water solution of an aliquot of the reaction product with cold dilute acid until the pH is less than 4.0. There should be no insolubility evidenced when the reaction is complete. Those protein materials which are normally soluble in dilute alkali are also more readily soluble in the amine reactant, and therefore the mere fact that these materials become solubilized by the amine reactant does not necessarily indicate completion of the reaction. Difficultly alkali-soluble proteins, such as glue, gelatin, feathers, hair, hoof and horn meal, etc., when reacted pass into solution more slowly. Therefore completion of the reaction in the case where these more difficultly soluble materials are the proteinaceous reactant, is more reliably approximated as at that point when the protein is in solution in the amine.

A number of examples are set out below as illustrations of the process of the present invention and the products secured. They are not, however, intended to be construed as placing limitations on the scope of the invention other than those set out in the appended claims.

Example I

Into a reaction vessel equipped with an efficient agitator, an air condenser, and means for vacuumizing the reaction vessel are placed 100 grams of bone glue having a 100-gram Bloom test and 100 grams of diethanolamine. The reactants are mixed and the reaction vessel is evacuated, after which heat is supplied to the reaction. The temperature is raised to 100° C. in about 20–30 minutes while the pressure is maintained at 125 millimeters of mercury. Traces of moisture can be observed distilling over. As soon as all the moisture is removed the temperature is raised somewhat more rapidly to the boiling point of the diethanolamine. This temperature is about 150–160° C. in the reaction mass at the pressure indicated. After about six hours of heating at 160° C. with efficient agitation, all of the glue protein has passed into solution forming a heavy viscous anhydrous mass. The reaction mass is cooled, while maintained under vacuum, to about 100° C., at which temperature it flows from the reaction vessel. The final product is a light brown fluid at 100° C. and a plastic solid at room temperature. The product is soluble in water and dilute acids forming a clear solution.

Example II

This example shows the use of an excess of the amine to control fluidity of the mixture where a higher jelly strength gelatin is employed as the protein reactant. 100 grams of gelatin (200 gm. Bloom test as gelatin) and 200 grams of diethanolamine were placed in a reaction vessel and treated substantially in accordance with the procedure set forth in Example I above. The excess amine was required to promote efficient agitation of the higher jelly strength gelatin. The final product was a light brown viscous mass soluble in water and dilute acids.

Example III

Equal weights of dried and ground hoof and horn meal and monoethanolamine were placed in the reaction vessel. Vacuum was applied, and the reaction was run until all moisture was removed at a temperature below about 100° C. The vacuum was removed and nitrogen gas was passed over the reaction mixture while the mixture was heated at the refluxing temperature of the amine (175° C.). After about five hours reaction time the condensation was complete as measured by solubility of a small portion of the reaction mass in water and dilute acids. Vacuum was again applied to the reaction mixture in order to deodorize the product. Deodorization is recommended when the protein raw material is rich in sulfur compounds. The final product, while similar in physical characteristics to those prepared in accordance with the procedure of Examples I and II above, was somewhat darker brown in color.

Example IV

Diisopropanolamine and casein, equal parts, were treated substantially in accordance with the method set forth previously, and refluxing of the mixture was carried out at the boiling point of the diisopropanolamine. The protein material, because of its inherently greater alkali solubility, was much more readily soluble in the diisopropanolamine although the viscosity was very high at the outset. As heating and agitation were continued, the viscosity dropped noticeably so that the final reaction product was a light tan clear viscous liquid.

Example V

This example shows the treatment of dried egg albumen with a polyamine. The reaction conditions were similar to those set forth previously wherein a dry protein and an alkylolamine were reacted. In this case equal parts of dried egg albumen and diethylene triamine were charged to the reaction vessel. The reactants were subjected to vigorous agitation while the mixture was vacuumized. After all apparent moisture had been removed at a temperature below about 100° C. the temperature was increased to the boiling point of the polyamine and refluxing was continued for about five hours. The final product was a heavy viscous semisolid basic material quite similar to that prepared from hoof and horn meal and monoethanolamine except that the color was much lighter.

Example VI

Equal parts of bone glue (140 gm. Bloom test) and triethylene tetramine were placed in the reaction vessel equipped with the agitator, air condenser, and vacuum equipment. The agitator was started and the vessel evacuated while heat was applied to the reaction vessel. The temperature of the reaction mix was held below 100° C. while vacuumization was maintained. Operating at a pressure of about 125 millimeters mercury, about 20–30 minutes is required to remove traces of moisture. After removal of the moisture the temperature is increased until the polyamine refluxes and this refluxing condition is maintained for about six hours. At the end of this time all of the bone glue has passed into solution forming a heavy viscous anhydrous mass. The final product was a brown-colored plastic solid.

While the reaction products in the preceding examples exhibited very similar properties except for variations in color and viscosity, this is not unusual since the original protein structure was substantially completely broken down by the amidation and the characteristics of the final product are the average of the complex mixture of derivatives of the constituent amino acids.

*Example VII*

This example shows the treatment of a wet protein product. Five hundred grams of degreased skins containing 35% protein and approximately 65% moisture were hashed to provide a finely comminuted mass. This hashed mix was placed in the reaction vessel described previously with 175 grams of diethanolamine. The mixture was heated under vacuum for about 45 minutes at a temperature less than about 100° C. to remove the water. As the last traces of water were removed, the temperature increased noticeably until the boiling point of the alkylolamine at the pressure in the reaction vessel was attained. In this case at an operating pressure of 125 millimeters mercury, the boiling point of the diethanolamine is about 150–160. Heating was continued for about six hours at 160° C. with efficient agitation until all of the protein had passed into solution forming a heavy viscous mass. After cooling under vacuum to about 100° C., the reaction product flows from the reaction vessel. The product is quite similar to the product obtained in the treatment of high test gelatin with diethanolamine as set forth in Example II above. However, the product of this example had a much greater tendency to develop suds. This latter characteristic is due to the presence of residual fat in the skin protein.

*Example VIII*

In the treatment of a wet protein with an alkylolamine, 200 grams of ox blood containing 25% protein solids was mixed with 50 grams of diisopropanolamine while agitating the mix and subjecting the mix to a vacuum of about 125 millimeters mercury. All of the moisture appeared to be removed from the mix at a temperature of less than about 100° C. This removal of water required about 40–45 minutes after which the temperature rose noticeably. When the temperature had reached the boiling point of the alkylolamine at the pressure indicated, refluxing was continued for 5–6 hours. When completion of the reaction was indicated by testing for solubility of the reaction product in a dilute acid solution, heating was terminated and the mix was cooled to about 100° C. while maintaining a vacuum in the reaction vessel. The reaction product, while similar to those described previously, was much darker in color.

*Example IX*

The following proteinaceous materials and amine-supplying reactants were reacted in accordance with the procedure indicated to produce what are believed to be substituted amides of the alpha amino acids or the simple peptides of the amino acids. The products all have the same general appearance, namely, that of being viscous hygroscopic masses varying in color from light tan to deep brown. All are basic to the limit of the free amine groups present and the molecular weights are larger than the starting amine reactant by an amount corresponding to the molecular weight of the amino acid or polypeptide with which they have reacted. Soaps of these materials with long chain saturated fatty acids are very soluble and exhibit excellent detergent and emulsifying properties. The solubility of products in alcohol increases with a decrease in the size of the peptide molecule treated. For example, the amides resulting from the reaction are more alcohol soluble if the amidation has been run over a longer period of time or at higher temperatures. Thus the amine reactants having higher boiling points tend to produce a substituted protein derivative which has a greater alcohol solubility probably because at the higher reaction temperature possible the protein is more completely depolymerized.

| Protein Reactant | Amine Reactant | Type of Procedure |
|---|---|---|
| 1. Animal glue | N-amino ethyl ethanolamine. | Example I. |
| 2. Cottonseed protein | Diethylene triamine | Do. |
| 3. Feather meal | Tetraethylene pentamine. | Do. |
| 4. Soya protein | Triethylene tetramine. | Do. |
| 5. Blood | Diethylene triamine | Example VII. |

While it is believed that the reaction involves amidation of peptides and amino acids, it should be understood that complex mixtures are obtained as the reaction product since all natural proteins are made up of many different amino acids. Undoubtedly certain proteins contain specific sequences of peptide linkages which prevent complete amidation. Therefore it is probable that, rather than the amino acid nucleus being the reactant, di, tri, and other simple peptides function as a unit. Collagen, glue, and gelatin which are all characterized by a predominance of glycine when treated with diethanolamine probably provide a mixture of (1) the diethanolamide of glycine, (2) the diethanolamide of diglycine, and (3) the diethanolamide of triglycine.

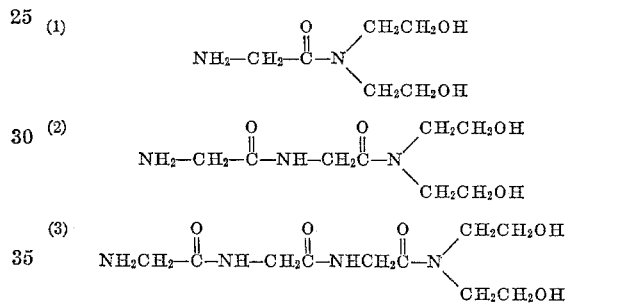

Therefore it is necessary that the product be described as a mixture of substituted amides of amino acids and their simple peptides. Also, inasmuch as the polyamine contains in some cases a plurality of reactive amino groups, it is probable that the reaction product contains amides which are amidated by amino groups at diverse positions in the polyamine molecule.

Anhydrous conditions are employed in order to avoid substantial hydrolysis which would prevent the recovery of any significant yield of amide. In the presence of substantial amounts of water or alkali, any amide formed is converted to the acid or acid salt as follows:

Excess water and caustic forces the equilibrium to the right, thus favoring production of the acid. For example, two 30 gm. samples of casein were reacted with 30 gm. of propylene diamine, one reaction being conducted under essentially anhydrous conditions and the other under mild hydrolysis conditions. The reaction product in each case was titrated with standard acid to determine whether amidation had taken place.

Sample:      Conditions
   A. 30 gm. casein+30 gm.    Autoclave, 150° C.
      propylene diamine_____    for 7 hrs.
   B. 30 gm. casein+30 gm.
      propylene diamine+150 gm.
      water_____    Do.

At completion of the reaction the samples were cooled and each taken up in 500 ml. ethanol. A 25 ml. aliquot from each was titrated with standard acid to determine how much amidation had taken place.

SAMPLE A

Of the original 30 gm. propylene diamine 13.6% or 4.1 gm. had been utilized in the reaction, the loss of amine group basicity being due to nonbasic amide formation.

SAMPLE B

Only 3.2% or .96 gm. of the original propylene diamine had been used up in the reaction, the remainder being present as free amine and as amine salts of the amino acids formed by hydrolysis.

Although the alkylolamides cannot be readily distilled without excessive decomposition, the solubility of these materials is very similar to the parent alkylolamine. While the amides derived from the treatment employing the polyamine are closely allied to the polyamine as the alkylolamides are to the starting alkylolamines, both of the individual reactants, namely, the proteinaceous materials and the amine-supplying element, are substantially improved as a result of the combination. The reaction products function as strongly basic materials and form soaps. They function as corrosion inhibitors as well as finding use in catalyzing certain polymerization reactions.

Obviously many modifications and variations of the invention as hereinbefore set forth may be made without departing from the spirit and scope thereof, and therefore only such limitations should be imposed as are indicated in the appended claims.

We claim:

1. A method for manufacturing substituted amides from proteinaceous materials, comprising: heating and reacting an amine-supplying composition having at least one acylatable amino hydrogen and selected from the group consisting of water-soluble aliphatic alkylolamines and water-soluble aliphatic polyamines with a proteinaceous composition having more than one peptide group under conditions such that there is present during the amidating reaction less than 20% water based on the weight of said proteinaceous composition, said reaction being carried out by heating the reaction mixture at a temperature sufficient to remove water from the system, said heating being conducted until an aliquot part of the reaction product is soluble in dilute aqueous acid whereby water-soluble amides of the constituent amino acids and polypeptides of said proteinaceous materials are formed.

2. The method of claim 1 wherein the proteinaceous composition is an animal protein.

3. The method of claim 1 wherein the proteinaceous composition is a vegetable protein.

4. A method for manufacturing substituted amides from proteinaceous materials, comprising: heating and reacting an amine-supplying composition having at least one acylatable amino hydrogen and selected from the group consisting of water-soluble aliphatic alkylolamines and water-soluble aliphatic polyamines with a proteinaceous composition having more than one peptide group under conditions such that there is present during the amidating reaction less than 20% water based on the weight of said proteinaceous composition, volatilizing water from the reaction mixture and conducting the reaction until an aliquot part of the reaction product is soluble in a cold, aqueous solution having a pH of less than 4.0, whereby water-soluble substituted amides of the constituent amino acids and polypeptides of said proteinaceous materials are formed.

5. The method of claim 4 wherein the amine-supplying composition is a straight chain aliphatic polyamine having from two to ten carbons.

6. The method of claim 4 wherein the amine-supplying composition is an aliphatic alkylolamine having two to ten carbons.

7. A method for manufacturing water soluble substituted amides from proteinaceous materials, comprising: heating and reacting an equal molar excess of an amine-supplying composition having at least one acylatable amino hydrogen and selected from the group consisting of water-soluble aliphatic alkylolamines and water-soluble aliphatic polyamines with a proteinaceous composition having more than one peptide group under conditions such that there is present during the amidating reaction less than 20% water based on the weight of said proteinaceous composition, said reaction being carried out by heating the reaction mixture at a temperature of at least about 100° C. whereby water is removed from the system and the constituent amino acids and polypeptides of said proteinaceous materials are amidated, and maintaining said temperature until an aliquot part of said amidated amino acids and amidated polypeptides is soluble in a cold, aqueous solution having a pH of less than 4.0.

8. A method for preparing substituted amides of proteinaceous materials, comprising: admixing an amine-supplying composition selected from the group consisting of water-soluble aliphatic polyamides and water-soluble aliphatic alkylolamines, said amine-supplying composition having at least one acylatable amino hydrogen, with a proteinaceous composition having more than one peptide group, reducing the moisture content of the mixture thus formed below about 20% water based on the weight of the proteinaceous composition, heating said mixture to a temperature sufficient to reflux said amine-supplying composition, maintaining said temperature until an aliquot part of the reaction product is soluble in dilute aqueous acid, whereby water-soluble substituted amides of the constituent amino acids and polypeptides of said proteinaceous materials are formed.

9. The method of claim 7 wherein the amine-supplying composition is present in an amount at least equal in weight to the amount of said proteinaceous composition.

References Cited by the Examiner

UNITED STATES PATENTS

| | | | |
|---|---|---|---|
| 2,143,023 | 1/1939 | Meigs | 260—119 |
| 2,173,448 | 9/1939 | Katzman et al. | 252—152 |
| 2,267,205 | 12/1941 | Kyrides | 260—583 |
| 2,574,635 | 7/1950 | Gates et al. | 260—117 |

FOREIGN PATENTS 543,119    2/1942    Great Britain.

OTHER REFERENCES

Mizushima et al., J.A.C.S. 73 (1951), pages 1330–33.
Wagner et al., Synthetic Organic Chemistry, John Wiley & Sons, Inc. (1953), page 567.

WILLIAM H. SHORT, *Primary Examiner.*

CHARLES B. PARKER, JOSEPH R. LIBERMAN, LEON J. BERCOVITZ, *Examiners.*